Figure 1D:
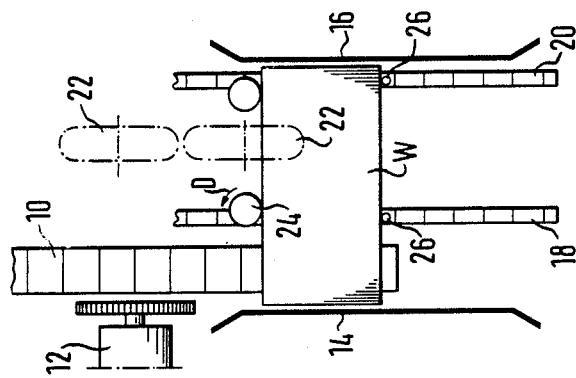

United States Patent [19]

Kalmbach

[11] Patent Number: 4,750,254

[45] Date of Patent: Jun. 14, 1988

[54] CONTINUOUSLY OPERATING ONE-SIDED FORMATTING AND EDGE SHAPING MACHINE

[75] Inventor: Kurt Kalmbach, Glatten, Fed. Rep. of Germany

[73] Assignee: Hornberger Maschinenbaugesellschaft mbH & Co. KG, Schopfloch b. Freudenstadt, Fed. Rep. of Germany

[21] Appl. No.: 812,753

[22] Filed: Dec. 23, 1985

[30] Foreign Application Priority Data

Dec. 28, 1984 [DE] Fed. Rep. of Germany ....... 3447703

[51] Int. Cl.[4] .................. B23Q 7/03; B65G 37/00
[52] U.S. Cl. .................................. 29/561; 83/418;
  83/421; 144/245 R; 144/245 E; 144/246 B;
  198/576; 198/586
[58] Field of Search ........... 144/245 R, 245 A, 245 E,
  144/246 R, 246 B, 246 G; 198/339.1, 576, 806,
  586, 606, 732; 29/561; 83/418, 420–422;
  409/138

[56] References Cited

U.S. PATENT DOCUMENTS

| | | | |
|---|---|---|---|
| 3,565,140 | 2/1971 | Jacobsen | 83/418 |
| 3,627,106 | 12/1971 | Winfield | 198/576 X |
| 3,802,094 | 4/1974 | Isoda | 198/606 X |
| 3,880,036 | 4/1975 | Yokoyama | 144/246 B X |
| 4,170,175 | 10/1979 | Conlon, Jr. | 198/806 X |
| 4,298,043 | 11/1981 | Seffens | 144/245 A X |
| 4,394,894 | 7/1983 | Gemmani | 198/339.1 |
| 4,417,653 | 11/1983 | Zwezrynen | 198/732 X |

FOREIGN PATENT DOCUMENTS 8114121 1/1982 Fed. Rep. of Germany .

Primary Examiner—Eugene F. Desmond
Assistant Examiner—Steven C. Bishop
Attorney, Agent, or Firm—Bernard, Rothwell & Brown

[57] ABSTRACT

A continuously operating one-sided formatting and edge shaping machine for edge processing four sides of work pieces is driven by a continuously running primary conveying means (10). A conveying device is mounted ahead of this single primary conveying means in the form of chain conveyors (18 and 20), which also operate continuously, so that a precisely aligned work piece can be transferred in this condition to the primary conveying means, for which purpose the two conveying means run synchronously with each other at least in the transfer area.

23 Claims, 7 Drawing Sheets

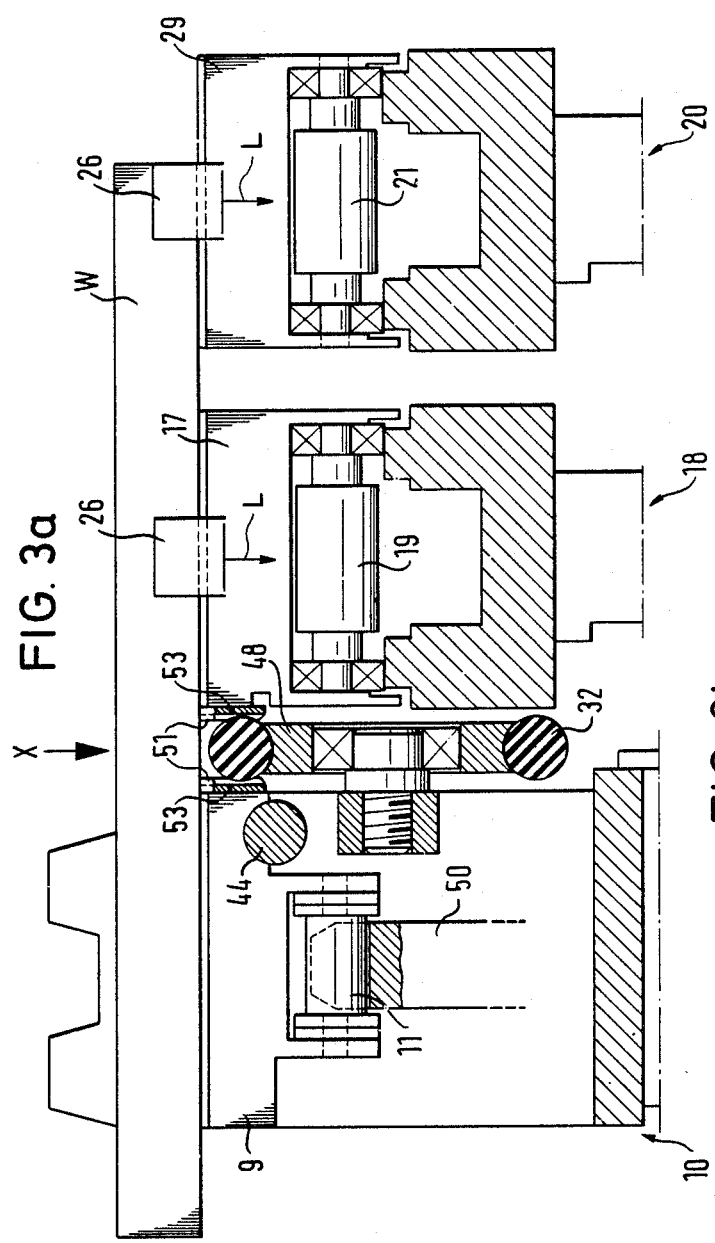
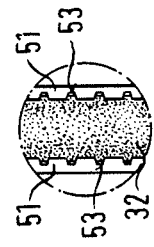

CONTINUOUSLY OPERATING ONE-SIDED FORMATTING AND EDGE SHAPING MACHINE

The invention relates to a continuously operating one-sided formatting and edge shaping machine for shaping the edges of work pieces on four sides, having a primary conveying means for conveying the work pieces past at least one edge shaping tool and having a front-mounted conveying device, also known as a pre-conveying device, for supplying the work pieces to the primary conveying means, which device includes: a support for the work pieces, at least one stop and a straightedge guide for the measurement and angular positioning of the work pieces.

Machines of this type are known, for example, as double-sided operating machines, in which two opposite edges are processed simultaneously. These double-sided operating machines assure good accessability, a relatively high work piece precision and a relatively high performance in terms of work pieces per unit of time. A disadvantage of this type of machine, however, is that these machines have to be equipped on two sides, i.e. each shaping tool is provided in duplicate. With complicated operational processes, this is very expensive. A further disadvantage is that in handling small batches or processing individual items, the machine must always be run until empty before a width adjustment is possible. This costs a great deal of valuable time. Finally, a very large amount of mass has to be moved during the width adjustment, which limits the speed of adjustment. This again results in an undesirable expense in time.

The tendency toward job-oriented processing, i.e. toward flexible processing of small batches or single items, is increasing. In addition, because of the desire for individual residence styles, furniture is becoming more and more versatile. This results in a requirement that the double-sided operating machine be adjusted quite frequently.

A one-sided operating formatting and edge shaping machine known from the German GM No. 81 14 121 is conditionally suited for the above-mentioned job-oriented processing. In this machine a conveying sled is provided as the front-mounted conveying device, on which is located a pivotable width adjustment straightedge guide, as well as a support and a stop for the supply of work pieces to the primary conveying means of the one-sided operating edge shaping machine. The work piece is placed on this sled and brought into abutment against the above-mentioned stop. The sled is then moved manually and the work piece, guided by the respective straightedge guide, is brought into the conveying area of the primary conveying means, where the work piece is grasped on one side and conveyed. This awkward handling, in addition to a discontinuous supply method, leads to an imprecise shaping of the work pieces and a relatively low processing of work pieces per unit of time. If the so-called planing cut and the width cut take place, then there are generally no problems in the transfer of the work piece from the sled to the primary conveying means, which is usually formed as a chain conveyor. However, a different situation results with a so-called angular cut, particularly if the work piece is guided along a relatively short length of the entry straightedge guide and the work piece extends relatively far laterally to the entry straightedge guide. When the work piece is grasped by the primary conveying means on one side, the work piece can easily be pulled apart if the supply does not take place exactly adapted to the movement of the primary conveying means 5. This is understandable if one assumes that generally an angular precision of +0.15 mm/m of length of the work piece and a parallelism precision of +0.1 mm/m is required.

In addition, it has been taught in DE-OS No. 32 48 497 to form a double-sided operating machine in such a manner that it operates on two sides only over a portion of its length, i.e. in such a manner that the conveying means, which are provided on two sides in this machine, convey on only one side through a certain section. At the beginning of the double-sided operating machines there is generally a special entry chain conveyor which serves only to transfer the work piece on the primary chain conveyer without any clamping overlapping taking place.

The object of the invention is to create a one-sided operating formatting and edge shaping machine having a relatively high work piece production and high work piece precision, particularly with angular cuts.

This object is achieved according to the invention in that the front-mounted conveying device is a continuously operating conveying means, the conveyance movement of which is synchronous with the conveyance movement of the primary conveying means at least in the area of the work piece transfer to the primary conveying means.

This solution combines the advantages of the double-sided operating machine and the above-described one-sided operating machine such that with a largely automatic operation, a relatively high work piece precision and work piece productivity can be achieved, while avoiding the disadvantages of the double-sided operating machines.

With this solution, a rapid and easy adjustment can take place to adapt to the respective work pieces, because only the relatively small front-mounted conveying device, having low movements of mass, need be adjusted. This adjustment can be performed even while the edge shaping of the work piece passing through it taking place. This results in no or only very short empty operating periods. The total system represents a small, flexible, economical and automatable processing unit, particularly when only a shaping cut or only an edge gluing takes place.

According to one advantageous embodiment, the front-mounted conveying device consists of at least two revolving chain conveyors or technically equivalent conveying means lying parallel to the primary conveying device and which form the support for the work pieces, which chain conveyors have carriers arranged at intervals on their support surface side. These carriers, which are located on both chain conveyors, are aligned with each other exactly perpendicular to the direction of movement of the chain conveyors.

The above-mentioned carriers can be arranged so as to be capable of being lowered, because they may not be necessary in a so-called planing cut or in a wide cut. However, in a so-called angular cut they very positively assist in precisely aligning the work piece against an entry straightedge guide or against an adjustable straightedge guide.

The chain conveyors of the front-mounted conveying device laterally overlap a primary chain conveyor of the primary conveying means, whereby one of the two chain conveyors of the front-mounted conveying device is frictionally and/or form-fittingly connected with the primary chain conveyor in this area of overlap. This leads to a precise synchronous movement of the chain conveyor of the front-mounted conveying device and the primary chain conveyor in the area where the work piece is transferred from the front-mounted conveying device to the primary conveying means. Particularly with a so-called angular cut, this has a positive effect in that with an automatic operation and a continuous supply of work pieces, the work piece cannot be pulled apart during the transfer and the originally aligned work piece remains precisely aligned when it arrives in the area of the edge shaping tools.

For a precisely synchronous running between the two chain conveyors of the front-mounted conveying device and the primary chain conveyer, one of the two chain conveyors is itself a component of the primary conveying means, i.e. is one therewith. Then, the other chain conveyor can be made to be laterally adjustable relative to the direction of movement, preferably together with an adjustable straightedge guide, so that there is always a defined rest for the work pieces.

With a view toward a particularly simple and effective solution, in the above-mentioned overlap area between the one chain converyor and the front-mounted conveying device and the primary chain conveyor there is provided an endless belt preferably made of rubber or other suitable material of a certain hardness, which is clamped between the overlapping chain conveyors in such a manner that the drive of the chain conveyor of the front-mounted conveying device occurs synchronously with the primary chain conveyor. The endless belt thereby preferably has a circular cross section.

As an alternative to this frictional and possibly partially form-fitting synchronous transfer from the chain conveys, there is also a possibility of a mechanical movement transfer by means of the diverting wheel shafts of the main chain conveyor and the two chain conveyors of the front-mounted support device in the above-mentioned area of overlap.

Finally, there is also the possiblity of using camcontrolled carriers which engage in the overlap area, i.e. they come into engagement at the beginning of the overlap area and are taken out of engagement at the end of the overlap area, namely as a result of the action of a cam control.

For a controlled supply of work pieces by the supply device in connection with the so-called planing cut, width cut, angular cut and longitudinal angular cut, the front-mounted conveying device is associated with an aligning, compression and draw-in device, which has at least one driven draw-in roller to pull in the work piece against an entry straightedge guide or against an adjustable straightedge guide arranged parallel thereto and at least one driven compression roller for pressing the work piece against the entry straightedge guide when the work piece is to be brought into contact with the carriers. By this means it is possible to bring the respective edges of the work piece into abutment with one or the other of the straightedge guides, depending on the type of cut to be made.

The draw-in roller, of which there is at least one, can be adjusted between two positions, whereby in the one position a work piece is drawn against the entry straightedge guide and in the other position a work piece is drawn against the adjustable straightedge guide. In a particularly advantageous embodiment, the draw-in roller and the compression roller can be arranged on a drive head which can be set in three positions, two of which correspond to the above-mentioned positions of the draw-in roller, in which the compression roller is out of engagement with the work piece. In the third position the draw-in roller does not engage the work piece.

The center of this drive head is preferably a driven beveled gear transmission having a drive entry gear, a first driven output gear for the draw-in roller and a second driven output gear for the compression roller, whereby these driven gears can be pivoted with their associated rollers.

In order to be able to attain the various positions in a simple manner, so that the draw-in roller can be brought into and out of engagement with the work piece, the drive head can be moved along a slide bar, which is inclined at an angle to the surface of the work piece such that at one end of the bar the draw-in roller is in engagement with the work piece and at the other end it is not.

Preferably, the drive head is connected with the upper compression assembly of the primary conveying means, so that there can be common adaptation to the thickness of the particularly work piece.

For purposes of the invention, the chain conveyors of the front-mounted conveying device can be arranged on one side of the primary conveying means. There is also the possibility, however, of arranging one of the chain conveyors of the front-mounted conveying device on each side of the primary conveying means.

If one of the two chain conveyors of the front-mounted conveying device is a component of the primary conveying means, i.e. is formed by the primary conveying means, specifically the primary conveying chain, then the primary conveying chain can be coupled together for drive purposes by means of the fact that the entry-side diverting wheel driven by the primary chain conveyor is mechanically coupled with the entry-side diverting wheel of the adjacent chain conveyor by means of a diverting wheel shaft, so that in a simple designed manner the above-mentioned synchronization effect can be achieved.

Because in this case the primary conveying chain is drivingly drawn with respect to the upper operating drum and the upper drum of the adjacent chain conveyor is drivingly pushed, the above-mentioned thrust has an influence on the precision of the synchronization effect. In order to compensate for this, the other diverting wheel of the adjacent chain conveyor is biased away from the entry-side diverting wheel by a strongly tensed compression springs.

Figure 1C:
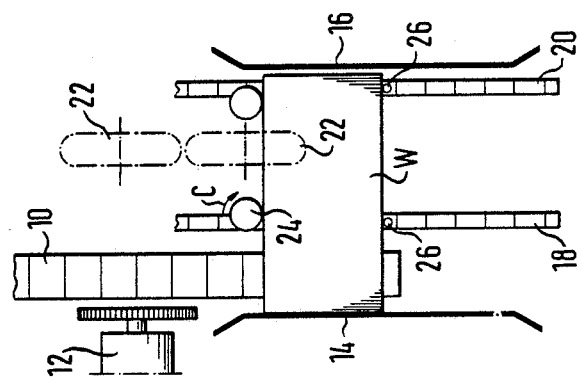
Figure 1B:
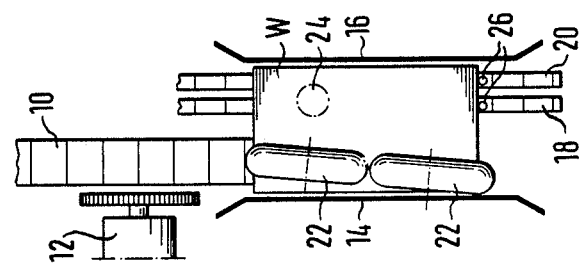
Figure 1A:
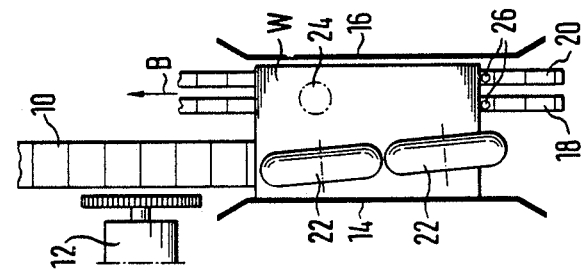
Figure 2:
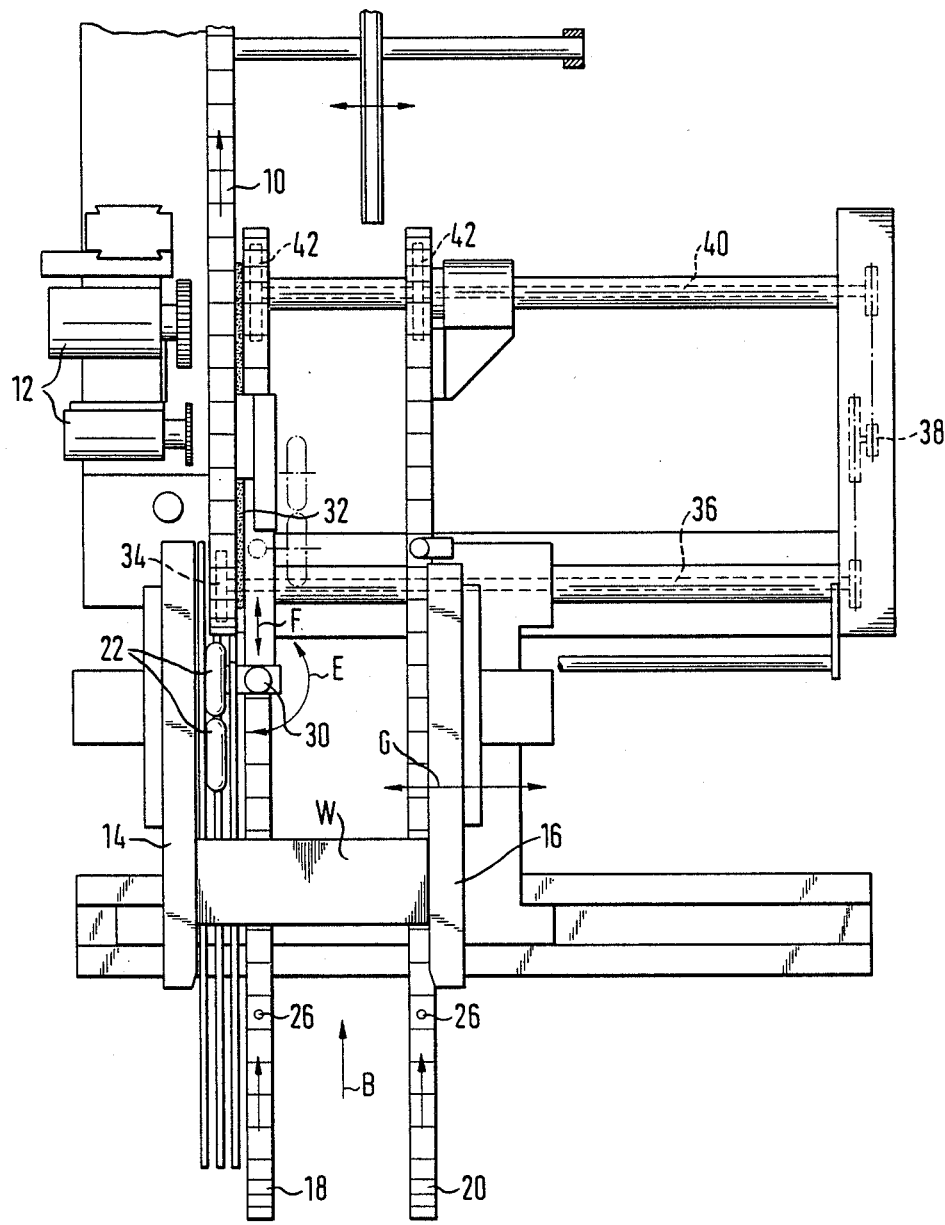
Figure 4:
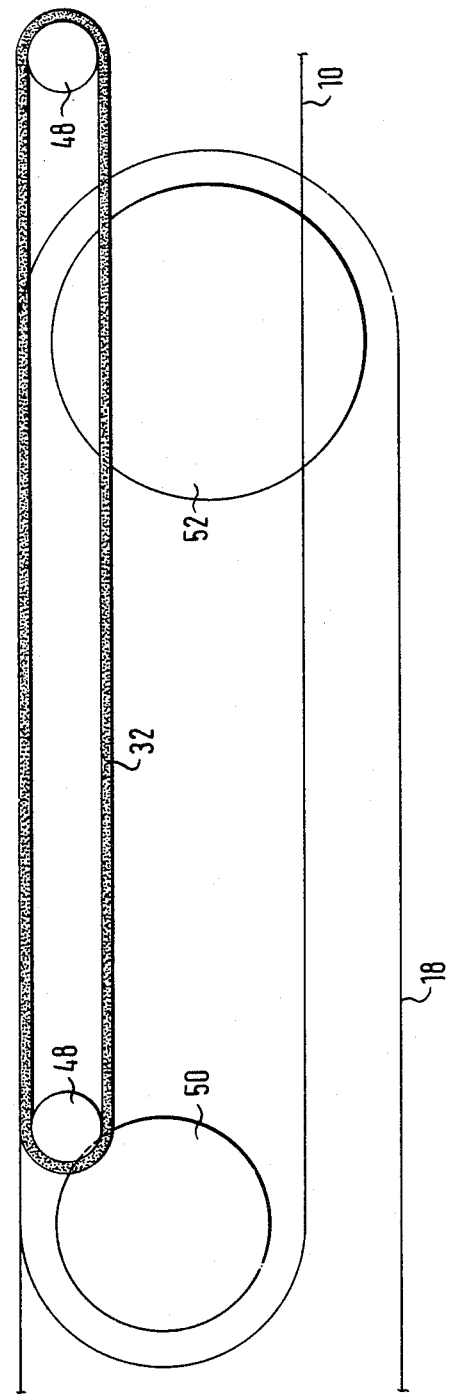
Figure 5:
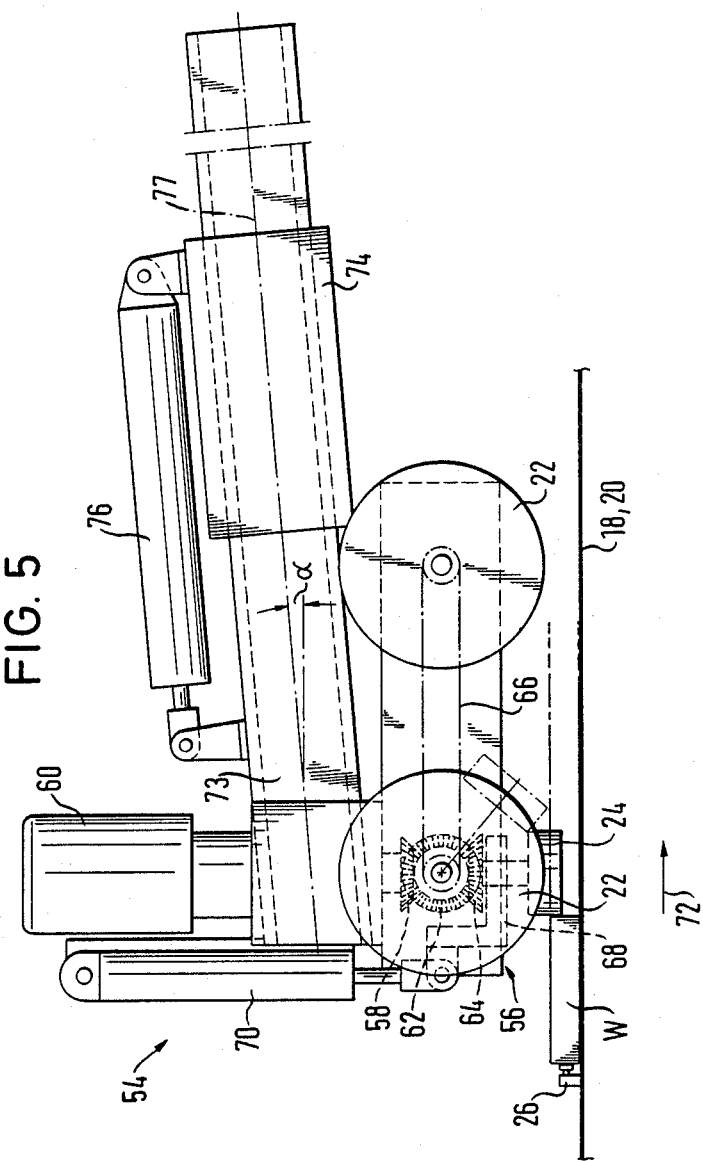
Figure 6:
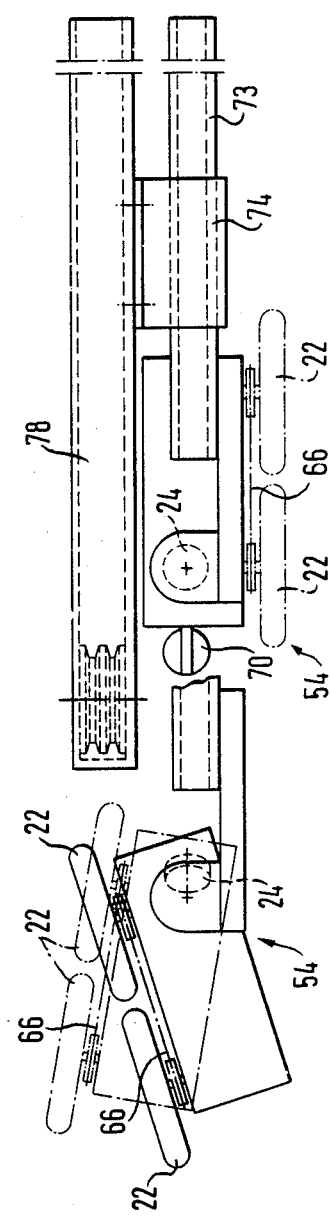
Figure 7:
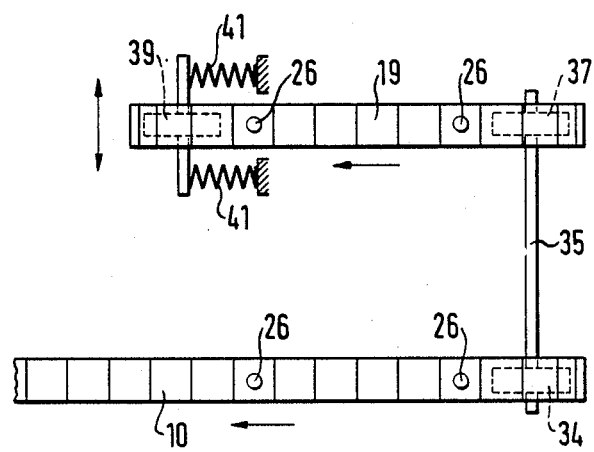

Further details, characteristics and advantages of the invention are illustrated by the following specification of the exemplary embodiments illustrated in the drawings. Shown are:

FIGS. 1a through 1d, which are schematic views of a primary conveying means having a front-mounted conveying device for, respectively, the planing cut, the width cut, the angular cut and the longitudinal angular cut, FIG. 2, which is a detailed, schematic top view of the front-mounted conveying device, FIG. 3a, which is a sectional view through a synchronous transfer device between the primary conveying chain and the conveying chain of the front-mounted conveying device, FIG. 3b, which is a partial section in the direction of arrow X, FIG. 4, which is a schematic side view of the overlap area between the primary conveying chain and one of the conveying chains of the front-mounted conveying device with a synchronous endless belt lying therebetween, FIG. 5, which is a schematic side view of the drive head with the draw-in rollers and the compression roller in the operational position for the compression roller, FIG. 6, which is a top view of the drive head with its various positions, and FIG. 7, which is a schematic top view of an entry area, in which a chain conveyor of the front-mounted conveying device is formed by the primary chain conveyor.

For a four-sided processing of work pieces, these work pieces must pass through the one-sided operating processing machine four times, with a different operation being performed each time. To prepare for each of these four different processes, several aligning, compression and draw-in steps are necessary. This is intended to be briefly described with reference to the FIGS. 1a through 1d, where the various settings are illustrated schematically.

In FIG. 1, the reference numeral 10 refers to a primary conveying chain, above which is arranged an upper compression assembly (not shown in FIG. 1). Adjacent the primary chain conveyor 10 is located a processing tool 12. Laterally adjacent the primary chain conveyor is illustrated a rigid entry straightedge guide 14, with an adjustable straightedge guide 16 being arranged at a distance therefrom. These straightedge guides are components of a conveying device mounted in front of the primary chain conveyor 10 having two short, parallel chain conveyors 18 and 20, whereby the left chain conveyor 18 is arranged in a fixed relationship adjacent the primary chain conveyor 10, so that both chain conveyors overlap each other over a certain area. The second chain conveyor 20 is rigidly disposed relative to the adjustable straightedge guide 16 and can be adjusted therewith laterally to the general direction of movement, indicated with the arrow B, in order to accomodate an adaptation to the various work pieces W. Two draw-in rollers 22 are arranged above the work piece, which are connected with at least one compression roller 24 by means of common drive head. As shown by the entire drawing in FIG. 1, the combination of the draw-in rollers 22 and the compression rollers 24 can be set in three positions. Accordingly, the draw-in rollers can, on the one hand, assume the operational position illustrated in FIG. 1a, and, on the other hand, can assume the operating position illustrated in FIG. 1b. In the operating position illustrated in FIG. 1c, only the compression rollers 24 are in operation, but not the draw-in rollers 22, which are shown there in broken lines, because there they are not in their operational position. Carriers 26 are arranged at certain intervals in the front-mounted chain conveyors 18 and 20, which carriers are arranged so as to be capable of moving into and out of position. These carriers function only in an angular cut, as illustrated in FIG. 1c and in a longitudinal cut, as illustrated in FIG. 1d. These carriers serve to provide a precise alignment of the work piece laterally to the direction of movement, which, in a planing cut according to FIG. 1a and in a width cut according to FIG. 1b, is not absolutely necessary. To the contrary, in those situations the carriers would have a detrimental effect.

In the position illustrated in FIG. 1a the so-called planing cut takes place. In this setting the two draw-in rollers 22 are driven and adjusted by means of a slip coupling in such a manner that the work piece is placed against the entry straightedge guide 14. The transport then takes place by means of the cahin conveyors 18 and 20, on which the work piece W is placed.

In a width cut the planed edge is placed against the adjustable straightedge guide 16 by means of the position of the draw-in rollers 22 according to the illustration in FIG. 1b, so that the work piece can be cut exactly to width. The continuously revolving chain conveyors 18 and 20 result in a continuous supply of work pieces into the clamping nip of the primary conveyor 10, where the transport of the work piece is automatically taken over by the primary conveyor 10, without an operator having to lay a hand on it.

For the angular cut illustrated in FIG. 1c, the unit comprising draw-in rollers and compression rollers is brought into the operating position illustrated in FIG. 1c, in which only the compression rollers 24 contact the lading edge of the work piece. Accordingly, as shown in FIG. 1c, one of the compression rollers rotates clockwise according to the arrow C and pushes the work piece left toward the entry straightedge guide 14. Simultaneously, the compression rollers offer resistance to the work piece in the direction of movement, so that the work piece comes precisely into contact with the carriers 26. As this happens, the compression rollers 24 find themselves shortly in front of the point which the primary chain conveyor 10 takes over. The carriers 26 then push the spring-biased compression rollers 24 to the side over the work piece, so that the work piece is transferred to the primary chain conveyor 10 in precise alignment. Accordingly, the two-front mounted chain conveyors 18 and 20 move at the same speed as the primary chain conveyor 10, at least in the transfer area.

Thereafter, the longitudinal angular cut takes place, in which the work piece is rotated by 180 degrees, placed on the two chain conveyors 18 and 20, and then the same process takes place as in the angular cut, except that the one compression roller is rotated in the opposite direction according to the arrow D, so that the compression roller plaes the work piece W against the adjustable straightedge guide 16.

FIG. 2 shows more detail of the front-mounted conveying device. As shown in the drawing, the drive head 30, by means of which the draw-in rollers 22 and the compression rollers 24 (not shown there) are moved into their various positions, can pivot back and forth according to the double arrow E and can move back and forth in the direction of movement according to the double arrow F. The general direction of conveyance is indicated by the arrow B.

The adjustable straightedge guide 16 can be moved back and forth together with the front-mounted chain conveyor 20 laterally to the direction of movement B in the direction of the double arrow G, so that only small amounts of mass have to be moved, which results in a rapid adjustment movement.

A rubber endless belt 32 is clamped between the primary chain conveyor 10 and the stationary front-mounted chain conveyor 18, and by means of this belt, the primary chain conveyor 10 directly drives the front-mounted chain conveyor 18 and, together therewith, the other front-mounted chain conveyor 20, so that a synchronous running of the two chain conveyors is guaranteed in the transfer area for the work piece and a pulling apart of the work piece can thus be avoided during the transfer, even if the entire process runs automatically.

This synchronous running can also be achieved in that the diverting chain wheel 34 of the primary chain conveyor 10, shown in broken lines in FIG. 2, is applied to the diverting wheels 42 of the front-mounted chain conveyors 18 and 20 by means of a shaft 36, a transmission 38 and an additional shaft 40, in order to effect a synchronous running. A solution of this type will naturally be used only as an alternative to the endless belt 32 described above.

The solution with the endless belt is shown particularly in FIGS. 3a, 3b and FIG. 4. The three chain conveyors are illustrated adjacent one another in FIG. 3a, according to a section lateral to the direction of movement of the chain conveyors, namely, at the extreme left is the primary chain conveyor 10, then the immediately adjacent, overlapping and stationary chain conveyor 18 of the front-mounted conveying device and adjacent the chain conveyor 18 to the right at a close spacing is the chain conveyor 20, which is preferably arranged so as to be adjustable with the adjustable straightedge guide. The chain conveyors consist in principle of a conveying chain 11 or 29 or 21. Successively arranged chain plates 9, 17 and 19 are placed on the respective conveying chains, which plates form the actual support for the work piece W. In this regard a side guide bar 44 engages in the underside of the chain plates 9 of the primary chain conveyor 10. A revolving synchronization belt 32, which is shown particularlyin FIG. 4 and is guided around diverting wheels 48, is located between the primary chain conveyor 10 and the stationary chain conveyor 18 of the front-mounted conveying deivce in the area where they overlap. The primary chain conveyor 10 is guided over a chain wheel 50 in the area of overlap and the front-mounted chain conveyor 18 is guided over a chain wheel 52, with the actual overlap area being formed between these chain wheels. The sides which face each other of the chain plates 9 and 17 of the adjacent, overlapping chain conveyors 10 and 18, are formed as friction transfer surfaces 51 which are provided with depressions 53. The synchronization belt 32 preferably is made of rubber of a certain hardness, which is compressed by the two chain conveyors in such a manner that the material can penetrate into the above-mentioned depressions. In this manner there occurs a combined frictional and form-fitting connection between the synchronization belt 32 and the chain conveyors 10 and 18, so that the chain conveyor 18 moves at the same speed as the primary chain conveyor 10, at least in the area of overlap therewith. The same is true for the chain conveyor 20, because it is coupled with the chain conveyor 18 by means of a rigid shaft.

Advantageously, carriers 26 are arranged so as to be capable of being lowered, as indicated by arrows L in FIG. 3a.

FIGS. 5 and 6 illustrate the combination drive head 54 for the draw-in and compression of the work piece W against the above-mentioned straightedge guides. The central element of this drive head is a beveled gear transmission 56 with a beveled drive gear 58 that is directly connected with the drive motor 60. This beveled entry drive gear 58 engages with a central beveled driven output gear 62, the axis of which is perpendicular to the beveled entry gear 58. This first beveled driven output geat 62 engages with a second beveled driven output gear 64, the axis of which is aligned with the axis of the beveled entry drive gear 58. The first beveled driven output gear 62 also is connected with a draw-in roller 22 of the above-described type, which, in turn, is connected with a further draw-in roller 22 by means of a belt drive 66. The second beveled driven output gear 64 is connected with the above-mentioned compression roller 24, which is associated with the second, non-driven compression roller, as shown in FIG. 1c. This driven compression roller 24 is connected with an adjusting lever 68, which can be pivoted against the force of an adjusting lever 68, which can be pivoted against the force of an adjustment cylinder 70 by the work piece W moving in the direction of the arrow 72, into the position shown in broken lines.

Once the work piece has passed by, the adjustment cylinder 70 returns the compression roller back into the position indicated by solid lines. The combined drive head 54 is guided by an adjustment bar 73 in an adjustment guide 74. The drive of the adjustment bar 73 is accomplished by means of an additional adjustment cylinder 76, which is attached at one end to the adjustment guide 74 and at the other end to the adjustment ber 73. The central axis 77 of the adjustment bar 73 is inclined to the horizontal by an angle $\alpha$, as shown in FIG. 5, so that in the right end position and operational position for the compression rollers 24, illustrated in FIG. 5, the draw-in rollers 22 are raised in such a manner that they lie slightly above the upper side of the work piece W and therefore do not engage it.

FIG. 6 shows that the adjustment guide 74 is rigidly connected with the upper compression assembly 78 of the primary conveying means. Accordingly, when the upper compression assembly 78 is set at the height of the work piece passing through, there is also a synchronous adjustment of the above-mentioned drive head and the associated draw-in rollers 22 and the compression rollers 24. Again here in FIG. 6, all of the positions of the draw-in rollers and the compression rollers are illustrated. In the completely extended position of the drive head the draw-in rollers 22 assume the position illustrated by the solid lines, and on the one hand, and on the other hand assume the position shown at the left in broken lines, where the draw-in rollers 22 move the work piece against either the entry straightedge guide or the adjustable straightedge guide. In this position the compression roller 24 is pivoted into the position illustrated in FIG. 5 by the adjustment cylinder 70, where this roller does not engage the work piece. In the fully retracted position of the drive head at the right, the compression roller is in the operational position illustrated in FIG. 5 and the draw-in rollers 22, in their position indicated in broken lines, do not engage the upper side of the work piece. The movements necessary to reach the respective positions of the above-mentioned rollers are permitted by the above-described beveled gear transmission in combination with the adjustment bar 22.

According to FIG. 7, the primary conveying chain 10 also forms one chain conveyor of the front-mounted conveying device, so that only one chain conveyor of the front-mounted conveying device is provided as an additional chain conveyor 19. The driving, mechanical coupling is provided in that the entry-side diverting wheels 34 and 37 of the primary conveying chain 10 and of the adjacent chain conveyor 19 are directly coupled by means of a diverting wheel shaft 35. In this manner the primary chain conveyor 10 is drawn in the direction according to the arrow in FIG. 19, because the drive is provided at the other end. By means of this drive, the diverting wheel 34 is driven directly. This drive is transfered to the entry-side diverting wheel 37 of the adjacent chain conveyor by the diverting wheel shaft 35, so that both chain conveyors are driven synchronously. However, the upper drum of the adjacent chain conveyor 19 is not drawn, as is the upper drum of the primacy chain conveyor 10, but rather is pushed. This can lead to imprecision in the desired synchronization effect. To assure that this pushing force has no influence on the precision of the synchronization effect, the other diverting wheel 39 of the adjacent chain conveyor is strongly biased away from the entry-side diverting wheel 37 by compression springs 41.

The carriers 26 are also shown in this drawing. The carriers 26 on the adjacent chain conveyor 19 and the primary chain conveyor 10 must be precisely aligned longitudinally, so that the same carrier pairs can always come into action together.

I claim:

1. A continuously operating one-sided formatting and edge shaping machine for shaping edges of four-sided work pieces, said machine having on a shaping side one primary conveying means for conveying work pieces being clamped on the primary conveying means by a compression assembly and having a front-mounted pre-conveying device for conveying the work pieces to the primary conveying means, the primary conveying means and the pre-conveying device being disposes in an overlapping manner, said pre-conveying device including a support for the work pieces, at least one stop and an entry straightedge guide for measuring and for correct angular positioning of the work pieces, the pre-conveying device being continuously operating conveying means having a conveyance movement which is synchronous with conveyance movement of the primary conveying means in the overlapping area, the pre-conveying device is associated with an aligning, pressing and draw-in device, which has at least one driven draw-in roller to pull the work piece in and against said entry straightedge guide, and at least one driven pressure roller to press the work piece against the entry straightedge guide.

2. Machine according to claim 1, characterized in that the front-mounted pre-conveying device is comprised of at least two revolving chain conveyors (18, 20) which have directions of movement and run parallel to the primary conveying means (10), form support surfaces for the work pieces (W), and include carriers (26) arranged at intervals on the support surfaces of said chain conveyors, and that associated carriers (26) of the two chain conveyors (18, 20) are aligned with each other perpendicularly to the direction of movement of the chain conveyors.

3. Machine according to claim 2, characterized in that the carriers (26) are arranged so as to be capable of being lowered.

4. Machine according to claim 2, characterized in that the chain conveyors (18, 20) of the front-mounted pre-conveying device laterally overlap a primary chain conveyor of the primary conveying means (10).

5. Machine according to claim 2, characterized in that one of the two chain conveyors is a component of the primary conveying means.

6. Machine according to claim 2, characterized in that one (20) of the two chain conveyors can be adjusted laterally to its direction of movement.

7. Machine according to claim 6, characterized in that the one chain conveyor (20) can be adjusted together with an adjustable straightedge guide (16).

8. Machine according to claim 4, characterized in that one (18) of the two chain conveyors of the front-mounted pre-conveying device is connected with the primary chain conveyor (10) at said overlap.

9. Machine according to claim 8, characterized in that an endless belt (32) is arranged at said overlap between and adjacent to the one chain conveyor (18) and the primary chain conveyor (10).

10. Machine according to claim 2 or 4, characterized in that diverting roller shafts (36, 40) of the primary chain conveyor (10) and of the two chain conveyors (18, 20) are mechanically coupled with each other at said overlap for a synchronous movement.

11. Machine according to claim 1, characterized in that said at least one draw-in roller (22) can be adjusted between two positions, and in that in one position the work piece (W) is drawn in against the entry straightedge guide (14) and in the other position the work piece (W) is drawn in against a second, adjustable straightedge guide (16).

12. Machine according to claim 11, characterized in that said at least one draw-in roller (22) and said at least one pressure roller (24) are arranged on a drive head (54) which can be set in a third positions, in which said two positions are such that the pressure roller (24) does not engage with the work piece (W), and in the third positions the draw-in roller (22) does not engage with the work piece (W).

13. Machine according to claim 12, characterized in that a center of the drive head (54) is a driven beveled gear transmission (56) having a drive entry gear (58), a first driven output gear (62) for the draw-in roller (22) and a second driven output gear (64) for the compression roller (24), whereby these driven gears are pivotable with their associated rollers (22,24).

14. Machine according to claim 12 or 13, characterized in that the drive head (54) can be shifted along an adjustment rod (72), so that the draw-in roller (22) can be brought out of engagement and the compression roller (24) can be brought into engagement with the work piece (W).

15. Machine according to claim 14, characterized in that an angle (α) of the adjustment rod (72) relative to an upper surface of the work piece is inclined such that in one end position of the adjustment rod the draw-in roller (22) is in engagement with the work piece (W) and at another end position the draw-in roller is out of engagement therewith.

16. Machine according to claim 12, characterized in that the drive head (54) is rigidly connected with the compression assembly (78) of the primary conveying means (10).

17. Machine according to claim 2, characterized in that the chain conveyors (18, 20) of the front-mounted pre-conveying device are arranged on one side of the primary conveying means (10).

18. Machine according to claim 2, characterized in that one of the chain conveyors (18, 20) of the front-mounted pre-conveying device is arranged on each side of the primary conveying means (10), respectively.

19. Machine according to claim 5, characterized in that a first entry side diverting wheel (34) driven by means of the primary chain conveyor (10) is mechanically coupled for driving purposes with a second entry side diverting wheel (37) of an adjacent chain conveyor (19).

20. Machine according to claim 19, characterized in that a third diverting wheel (39) of the adjacent chain conveyor (19) is biased away from the first entry-side diverting wheel (37) by means of a strongly tensed spring.

21. Machine according to claim 4, characterized in that one (18) of the two chain conveyors of the front-mounted pre-conveying device is frictionally connected with the primary chain conveyor (10) at said overlap.

22. Machine according to claim 4, characterized in that one (18) of the two chain conveyors of the front-mounted pre-conveying device is form-fittingly connected with the primary chain conveyor (10) at said overlap.

23. Machine according to claim 2, characterized in that said at least one drive draw-in roller (22) is arranged to pull the work piece (W) in and against an adjustable straightedge guide (16), and said at least one driven pressure roller (24) is arranged to press the work piece (W) against the adjustable straightedge guide (16), when the work piece is to be brought into contact with the carriers (26).

* * * * *